United States Patent
Kuan et al.

(10) Patent No.: US 10,466,839 B2
(45) Date of Patent: Nov. 5, 2019

(54) DYNAMIC DIFFERENTIAL ALGORITHM FOR SIDE TOUCH SIGNALS

(71) Applicant: SYNAPTICS INCORPORATED, San Jose, CA (US)

(72) Inventors: Chia-Yun Kuan, Sunnyvale, CA (US); Sanjay Mani, Los Altos Hills, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 348 days.

(21) Appl. No.: 15/085,263

(22) Filed: Mar. 30, 2016

(65) Prior Publication Data

US 2017/0285857 A1    Oct. 5, 2017

(51) Int. Cl.
G06F 3/044 (2006.01)
G06F 3/041 (2006.01)
G06F 3/0488 (2013.01)

(52) U.S. Cl.
CPC ............ G06F 3/0418 (2013.01); G06F 3/044 (2013.01); G06F 3/0416 (2013.01); G06F 3/0488 (2013.01)

(58) Field of Classification Search
CPC ...... G06F 3/0418; G06F 3/0416; G06F 3/044; G06F 3/0488
See application file for complete search history.

(56) References Cited

U.S. PATENT DOCUMENTS

| | | | |
|---|---|---|---|
| 5,488,204 A * | 1/1996 | Mead ...................... | G06F 3/041 178/18.06 |
| 5,880,411 A * | 3/1999 | Gillespie ............ | G06F 3/03547 178/18.01 |
| 7,337,085 B2 * | 2/2008 | Soss ...................... | G06F 3/0414 702/104 |
| 8,279,194 B2 | 10/2012 | Kent et al. | |
| 8,558,802 B2 * | 10/2013 | Osoinach ................ | G06F 3/044 178/18.06 |
| 8,593,431 B1 | 11/2013 | Karpin et al. | |
| 8,633,915 B2 | 1/2014 | Hotelling et al. | |
| 8,686,965 B2 | 4/2014 | Mi | |
| 8,773,396 B1 * | 7/2014 | Ksondzyk ............... | G06F 3/044 345/174 |
| 9,047,009 B2 | 6/2015 | King et al. | |
| 9,116,589 B2 | 8/2015 | Mi | |
| 9,727,159 B2 * | 8/2017 | Konradi .................. | G06F 3/044 |
| 9,921,668 B1 * | 3/2018 | Chadda ................ | H05K 999/99 |

(Continued)

*Primary Examiner* — Chanh D Nguyen
*Assistant Examiner* — K. Kiyabu
(74) *Attorney, Agent, or Firm* — Patterson + Sheridan, LLP

(57) ABSTRACT

Input devices described herein include sensing regions that permit the device to identify a location of input objects along a side of the device. To perform gesture detection, an input device selects baseline signals which are subtracted from capacitive sensing signals captured using the sensor electrodes in the sensing region. Doing so results in delta signals that represent the difference between the capacitive sensing signals and the baseline signals. In one embodiment, the baseline signals are selected from capacitive sensing signals received during previous capacitive frames. In one example, the input device uses the capacitive sensing signals received during the Nth previous capacitive frame as the baseline signals. Alternatively, the input device may determine which frame has capacitive sensing signals that vary the most from the current sensing signals and use that frame as the baseline.

15 Claims, 9 Drawing Sheets

(56) References Cited

U.S. PATENT DOCUMENTS

| | | | |
|---|---|---|---|
| 2003/0132922 A1* | 7/2003 | Philipp | G06F 3/0418 345/173 |
| 2008/0158169 A1* | 7/2008 | O'Connor | G06F 3/0418 345/173 |
| 2008/0158174 A1* | 7/2008 | Land | G06F 3/0418 345/173 |
| 2008/0158182 A1* | 7/2008 | Westerman | G06F 3/0416 345/173 |
| 2008/0167832 A1* | 7/2008 | Soss | G06F 3/0414 702/104 |
| 2010/0097342 A1* | 4/2010 | Simmons | G06F 3/0416 345/174 |
| 2010/0146458 A1* | 6/2010 | Wadekar | G06F 3/038 715/863 |
| 2010/0193258 A1* | 8/2010 | Simmons | G06F 3/0416 178/18.06 |
| 2010/0194692 A1* | 8/2010 | Orr | G06F 3/0414 345/173 |
| 2011/0063993 A1* | 3/2011 | Wilson | G06F 3/044 370/254 |
| 2011/0210936 A1 | 9/2011 | Wang et al. | |
| 2011/0210939 A1* | 9/2011 | Reynolds | G06F 3/0418 345/174 |
| 2011/0304570 A1* | 12/2011 | Maeda | G06F 3/0416 345/173 |
| 2012/0043970 A1* | 2/2012 | Olson | G01R 27/2605 324/601 |
| 2012/0044150 A1* | 2/2012 | Karpin | G06F 3/0416 345/173 |
| 2012/0075233 A1 | 3/2012 | Lakshminarayanan et al. | |
| 2012/0212445 A1 | 8/2012 | Heikkinen et al. | |
| 2012/0229419 A1* | 9/2012 | Schwartz | G06F 3/0418 345/174 |
| 2012/0249476 A1* | 10/2012 | Schwartz | G06F 3/044 345/174 |
| 2012/0283972 A1* | 11/2012 | Vandermeijden | G06F 3/0416 702/65 |
| 2013/0002579 A1* | 1/2013 | Hatano | G06F 3/0418 345/173 |
| 2013/0050144 A1* | 2/2013 | Reynolds | G06F 3/0416 345/174 |
| 2013/0093708 A1* | 4/2013 | Annett | G06F 3/041 345/173 |
| 2013/0154996 A1 | 6/2013 | Trend et al. | |
| 2013/0169584 A1* | 7/2013 | Konradi | G06F 3/044 345/174 |
| 2014/0074436 A1* | 3/2014 | Voris | G01R 27/2605 702/194 |
| 2014/0099992 A1* | 4/2014 | Burns | G06F 3/044 455/550.1 |
| 2014/0125623 A1* | 5/2014 | Atkinson | G06F 3/044 345/174 |
| 2014/0132551 A1 | 5/2014 | Bathiche | |
| 2014/0218333 A1 | 8/2014 | Wang | |
| 2014/0247401 A1 | 9/2014 | Lee et al. | |
| 2014/0267127 A1 | 9/2014 | Solven et al. | |
| 2014/0278173 A1* | 9/2014 | Elia | G01R 35/007 702/65 |
| 2014/0362001 A1 | 12/2014 | Westerman et al. | |
| 2014/0368750 A1 | 12/2014 | Liao et al. | |
| 2015/0022734 A1 | 1/2015 | Yang | |
| 2015/0049258 A1 | 2/2015 | Qiu et al. | |
| 2015/0145835 A1* | 5/2015 | Vandermeijden | G06F 3/0416 345/178 |
| 2015/0261347 A1* | 9/2015 | Sugita | G06F 3/044 345/174 |
| 2015/0268764 A1* | 9/2015 | Miyahara | G06F 3/044 345/174 |
| 2015/0309531 A1 | 10/2015 | Tanemura et al. | |
| 2015/0309618 A1* | 10/2015 | Keppel, Jr. | G06F 3/044 345/174 |
| 2015/0338937 A1* | 11/2015 | Shepelev | G06F 3/044 345/179 |
| 2015/0346903 A1* | 12/2015 | O'Connor | G09G 5/003 345/173 |
| 2016/0154509 A1* | 6/2016 | Yoshida | G06F 3/044 345/173 |
| 2017/0024124 A1* | 1/2017 | Ueno | G06F 3/0488 |
| 2017/0038962 A1* | 2/2017 | Schoen | G06F 3/04883 |

* cited by examiner

DYNAMIC DIFFERENTIAL ALGORITHM FOR SIDE TOUCH SIGNALS

BACKGROUND

Field

This invention generally relates to electronic devices and selecting a baseline to identify gestures along a single axis.

BRIEF SUMMARY OF THE INVENTION

One embodiment described herein is an input device that includes a plurality of sensor electrodes in a sensing region of the input device and a processing system coupled to the plurality of sensor electrodes. The processing system is configured to receive a plurality of capacitive sensing signals generated using the plurality of sensor electrodes, the plurality of capacitive sensing signals representing a location of an input object along a single axis and select capacitive sensing signals from a previous capacitive frame stored in a frame buffer to use as a baseline, wherein the frame buffer stores capacitive sensing signals received during a plurality of previous capacitive frames. The processing system is configured to generate delta measurements by calculating a difference between the plurality of capacitive sensing signals and the baseline, identify the location of the input object along the single axis based on the delta measurements, remove capacitive sensing signals corresponding to one of the plurality of previous capacitive frames stored the longest in the frame buffer, and add a new entry to the frame buffer based on the plurality of capacitive sensing signals.

Another embodiment described herein is a processing system that includes a baseline selector configured to receive a plurality of capacitive sensing signals generated using a plurality of sensor electrodes where the plurality of capacitive sensing signals representing a location of an input object along a single axis and selecting capacitive sensing signals from a previous capacitive frame stored in a frame buffer to use as a baseline, where the frame buffer stores capacitive sensing signals received during a plurality of previous capacitive frames. The baseline selector is configured to generate delta measurements by calculating a difference between the plurality of capacitive sensing signals and the baseline. The processing system includes a detection module configured to identify the location of the input object along the single axis based on the delta measurements and a filter configured to remove capacitive sensing signals corresponding to one of the plurality of previous capacitive frames stored the longest in the frame buffer and add a new entry to the frame buffer based on the plurality of capacitive sensing signals.

Another embodiment described herein is a method that includes receiving a plurality of capacitive sensing signals generated using a plurality of sensor electrodes, the plurality of capacitive sensing signals representing a location of an input object along a single axis and selecting capacitive sensing signals from a previous capacitive frame stored in a frame buffer to use as a baseline, wherein the frame buffer stores capacitive sensing signals received during a plurality of previous capacitive frames. The method includes generating delta measurements by calculating a difference between the plurality of capacitive sensing signals and the baseline, identifying the location of the input object along the single axis based on the delta measurements, removing capacitive sensing signals corresponding to one of the plurality of previous capacitive frames stored the longest in the frame buffer, and adding a new entry to the frame buffer based on the plurality of capacitive sensing signals.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
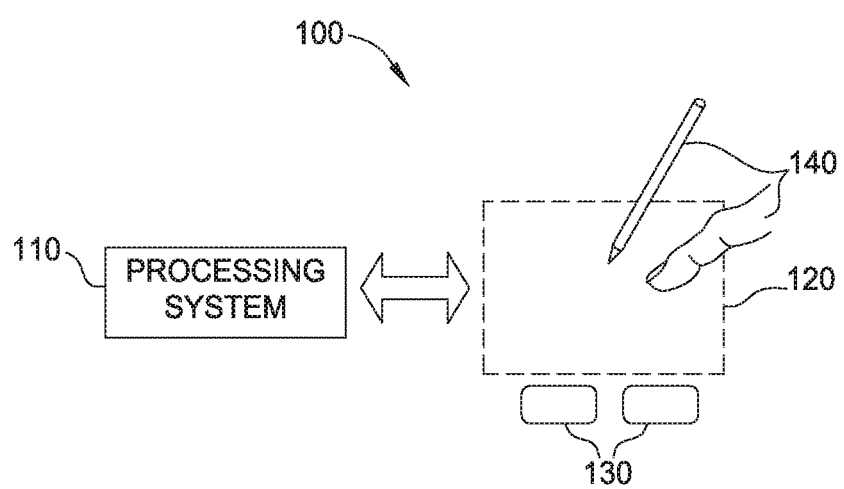
FIG. 1 is a block diagram of an exemplary system that includes an input device in accordance with an embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present invention provide input devices and methods that facilitate improved usability.

In one embodiment, the input devices include sensing regions that permit the device to identify a location of input objects (e.g., a finger, thumb, palm, or stylus) along a side of the device. For example, the sensing region may include sensor electrodes that form a stack with display elements used to display images to the user. By performing capacitive sensing with the sensor electrodes, the input device can identify the location of input objects that are proximate to the side of the sensing region as well as input objects that are contacting or hovering above the sensing region. For example, the user may use her left hand to hold the device while using her right hand to touch the sensing region. Because a thumb or finger in the left hand is close enough to the sensing region to affect the sensing signals used when performing capacitive sensing, the input device can determine when, for example, a user performs a tapping gesture with her thumb on a first side of the input device or uses a finger to swipe a second side of the input device. In this manner, the sensing region can be used to identify a location of input object along a single axis (e.g., a side of the sensing region) in order to determine a predefined gesture.

To detect gestures, the input device selects baseline measurements which are subtracted from capacitive sensing signals captured by the sensor electrodes in the sensing region. Doing so results in delta signals that represent the difference between the capacitive sensing signals and the baseline signals. In one embodiment, the baseline signals are selected from capacitive sensing signals received during previous capacitive frames. In one embodiment, the input device uses the capacitive sensing signals received during the Nth previous capacitive frame as the baseline (referred to as a differential baseline). Alternatively, the input device may compare the current capacitive sensing signals to the sensing signals for each of the previous capacitive frames to determine which frame has signals that vary the most from the current sensing measurements. The input device then uses the frame with the most different capacitive sensing signals as the baseline (referred to as a dynamic differential baseline).

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects 140 cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object 140. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object 140 near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system 110 for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
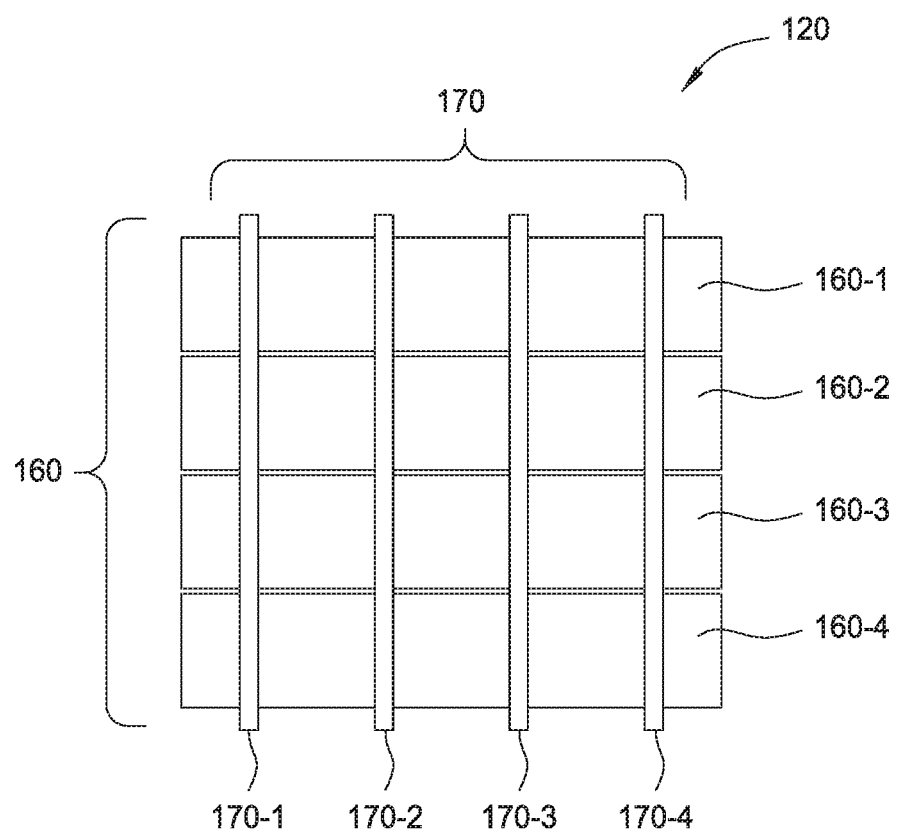
FIGS. 2A and 2B illustrate portions of exemplary patterns of sensing elements or capacitive sensing pixels, according to embodiments described herein.

FIG. 2A shows a portion of an exemplary pattern of sensing elements configured to sense in a sensing region 120 associated with the pattern, according to some embodiments. For clarity of illustration and description, FIG. 2A shows the sensing elements in a pattern of simple rectangles, and does not show various components. This pattern of sensing elements comprises a first plurality of sensor electrodes 160 (160-1, 160-2, 160-3, . . . 160-n), and a second plurality of sensor electrodes 170 (170-1, 170-2, 170-3, . . . 170-n) disposed over the plurality of sensor electrodes 160. In one embodiment, this pattern of sensing elements comprises a plurality of transmitter electrodes 160 (160-1, 160-2, 160-3, . . . 160-n), and a plurality of receiver electrodes 170 (170-1, 170-2, 170-3, . . . 170-n) disposed over the plurality of transmitter electrodes 160. In another embodiment, the first plurality of sensor electrodes may be configured to transmit and receive and the second plurality of sensor electrodes may also be configured to transmit and receive.

Transmitter electrodes 160 and receiver electrodes 170 are typically ohmically isolated from each other. That is, one or more insulators separate transmitter electrodes 160 and receiver electrodes 170 and prevent them from electrically shorting to each other. In some embodiments, transmitter electrodes 160 and receiver electrodes 170 are separated by insulative material disposed between them at cross-over areas; in such constructions, the transmitter electrodes 160 and/or receiver electrodes 170 may be formed with jumpers connecting different portions of the same electrode. In some embodiments, transmitter electrodes 160 and receiver electrodes 170 are separated by one or more layers of insulative material. In such embodiments, the transmitter electrodes and receiver electrodes may be disposed on separate layers of a common substrate. In some other embodiments, transmitter electrodes 160 and receiver electrodes 170 are separated by one or more substrates; for example, they may be disposed on opposite sides of the same substrate, or on different substrates that are laminated together.

The areas of localized capacitive coupling between transmitter electrodes 160 and receiver electrodes 170 may be termed "capacitive pixels." The capacitive coupling between the transmitter electrodes 160 and receiver electrodes 170 change with the proximity and motion of input objects in the sensing region associated with the transmitter electrodes 160 and receiver electrodes 170.

In some embodiments, the sensor pattern is "scanned" to determine these capacitive couplings. That is, the transmitter electrodes 160 are driven to transmit transmitter signals. The receiver sensor electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The baseline capacitance of a sensor device is the capacitive image associated with no input object in the sensing region. The baseline capacitance changes with the environment and operating conditions, and may be estimated in various ways. For example, some embodiments take "baseline images" when no input object is determined to be in the sensing region, and use those baseline images as estimates of their baseline capacitances.

Capacitive images can be adjusted for the baseline capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

Figure 2B:
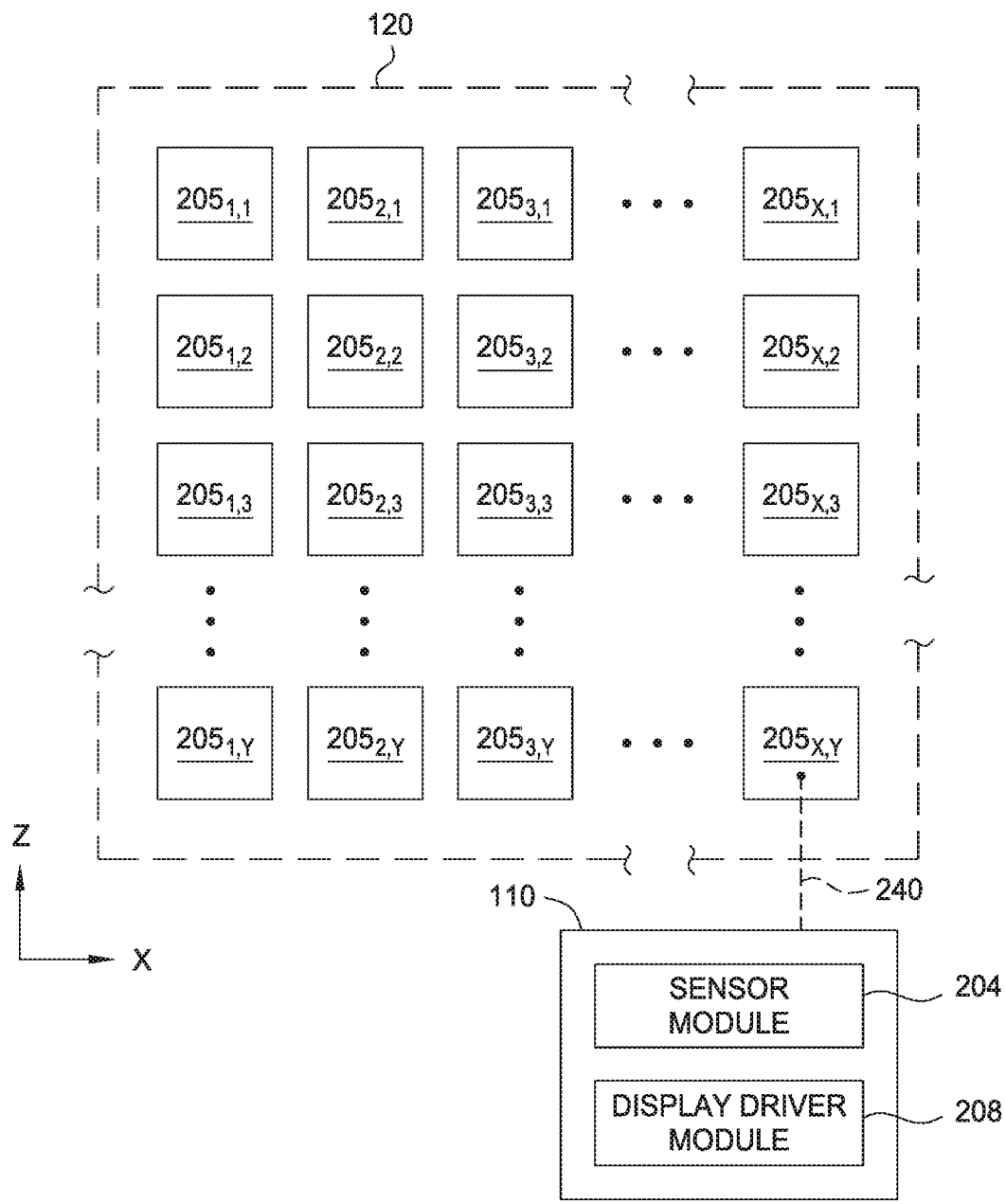

FIG. 2B shows a portion of an exemplary pattern of capacitive sensing pixels 205 (also referred to herein as capacitive pixels or sensing pixels) configured to sense in the sensing region 120 associated with a pattern, according to some embodiments. Each capacitive pixel 205 may include one of more of the sensing elements described above. For clarity of illustration and description, FIG. 2 presents the regions of the capacitive pixels 205 in a pattern of simple rectangles and does not show various other components within the capacitive pixels 205. In one embodiment, the capacitive sensing pixels 205 are areas of localized capacitance (capacitive coupling). Capacitive pixels 205 may be formed between an individual sensor electrode and ground in a first mode of operation and between groups of sensor electrodes used as transmitter and receiver electrodes in a second mode of operation. The capacitive coupling changes with the proximity and motion of input objects in the sensing region 120 associated with the capacitive pixels 205, and thus may be used as an indicator of the presence of the input object in the sensing region 120 of the input device.

The exemplary pattern comprises an array of capacitive sensing pixels 205X,Y (referred collectively as pixels 205) arranged in X columns and Y rows in a common plane, wherein X and Y are positive integers, although one of X and Y may be zero. It is contemplated that the pattern of sensing pixels 205 may comprises a plurality of sensing pixels 205 having other configurations, such as polar arrays, repeating patterns, non-repeating patterns, non-uniform arrays a single row or column, or other suitable arrangement. Further, as will be discussed in more detail below, the sensor electrodes in the sensing pixels 205 may be any shape such as circular, rectangular, diamond, star, square, noncovex, convex, nonconcave concave, etc. As shown here, the sensing pixels 205 are coupled to the processing system 110 and utilized to determine the presence (or lack thereof) of an input object in the sensing region 120.

In a first mode of operation, at least one sensor electrode within the capacitive sensing pixels 205 may be utilized to detect the presence of an input object via absolute sensing techniques. A sensor module 204 in processing system 110 is configured to drive a sensor electrode using a trace 240 in each pixel 205 with a modulated signal (i.e., a capacitive sensing signal) and measure a capacitance between the sensor electrode and the input object (e.g., free space or earth ground) based on the modulated signal, which is utilized by the processing system 110 or other processor to determine the position of the input object.

The various electrodes of capacitive pixels 205 are typically ohmically isolated from the electrodes of other capacitive pixels 205. Additionally, where a pixel 205 includes multiple electrodes, the electrodes may be ohmically isolated from each other. That is, one or more insulators separate the sensor electrodes and prevent them from electrically shorting to each other.

In a second mode of operation, sensor electrodes in the capacitive pixels 205 are utilized to detect the presence of an input object via transcapacitance sensing techniques. That is, processing system 110 may drive at least one sensor electrode in a pixel 205 with a transmitter signal and receive resulting signals using one or more of the other sensor electrodes in the pixel 205, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

In some embodiments, the capacitive pixels 205 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply to acquire resulting signals. The resulting signals may be used to determine measurements of the capacitive couplings at the capacitive pixels 205.

A set of measurements from the capacitive pixels 205 form a capacitive image (also capacitive frame) representative of the capacitive couplings at the pixels 205 as discussed above. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

Continuing to refer to FIG. 2B, the processing system 110 coupled to the sensing electrodes includes a sensor module 204 and optionally, a display driver module 208. In one embodiment the sensor module 204 comprises circuitry configured to drive a transmitter signal or a modulated signal onto and receive resulting signals with the resulting signals the sensing electrodes during periods in which input sensing is desired. In one embodiment the sensor module 204 includes a transmitter module including circuitry configured to drive a transmitter signal onto the sensing electrodes during periods in which input sensing is desired.

In various embodiments the sensor module 204 may comprise a receiver module that includes circuitry configured to receive a resulting signal with the sensing electrodes comprising effects corresponding to the transmitter signal during periods in which input sensing is desired. The receiver module may determine a position of the input object in the sensing region 120 or may provide a signal including information indicative of the resulting signal to another module or processor, for example, a determination module or a processor of the electronic device (i.e., a host processor), for determining the position of the input object in the sensing region 120. In one or more embodiments, the receiver module comprises a plurality of receivers, where each receiver may be an analog front ends (AFEs).

The display driver module 208 includes circuitry confirmed to provide display image update information to the display of the display device during non-sensing (e.g., display updating) periods. The display driver module 208 may be included with or separate from the sensor module 204. In one embodiment, the processing system comprises a first integrated controller comprising the display driver module 208 and at least a portion of the sensor module 204 (i.e., transmitter module and/or receiver module). In another embodiment, the processing system comprises a first integrated controller comprising the display driver module 208 and a second integrated controller comprising the sensor module 204. In yet another embodiment, the processing system comprises a first integrated controller comprising a display driver module 208 and one of a transmitter module or a receiver module and a second integrated controller comprising the other one of the transmitter module and receiver module.

The discussion above regarding FIGS. 2A and 2B describes various sensor arrangements suitable for sensing along a single axis. However, the techniques described herein can be applied to any sensor arrangement suitable to collect data along a single axis such as the top, bottom or sides of the sensing region 120. Moreover, the embodiments herein can be used with either transcapacitive or absolute sensing techniques in order to identify gestures as an input object (e.g., a finger) moves along an axis.

Figure 3A:
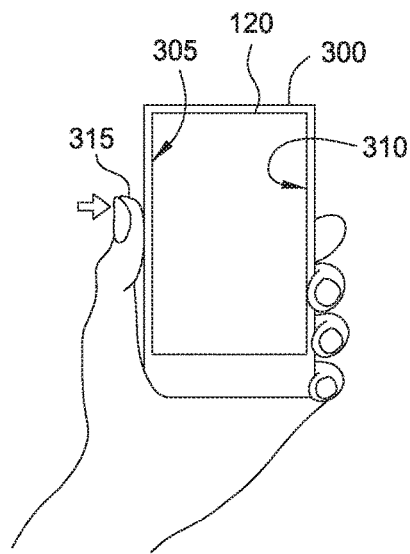
FIGS. 3A and 3B illustrate a tapping gesture along the side of an input device, according to one embodiment described herein.
Figure 3B:
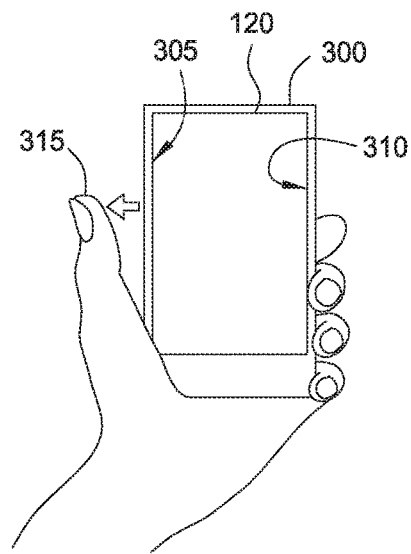

FIGS. 3A and 3B illustrate a tapping gesture along the side of an input device. Specifically, FIG. 3A illustrates an input device 300 that includes the sensing region 120 which may include any of the sensor electrode arrangements described above. In one embodiment, the sensor electrodes in the sensing region 120 are integrated with a display for displaying images to the user. Capacitive sensing can be used to permit the user to interact with the displayed image by, for example, entering text, opening applications, moving icons, interacting with graphical buttons, and the like. For example, the user may use an input object such as a finger or stylus to contact or hover over specific locations in the sensing region 120 in order to interact with displayed content.

In addition to detecting an input object directly above the sensing region 120, the input device 300 identifies a location of input objects to the side of the sensing region 120. In this example, the sensing region 120 includes a left side 305 and a right side 310 that are proximate to the fingers or palm of the user holding the input device 300. As shown, the fingers and palm are not directly above the sensing region 120 as defined by a direction perpendicular to the sensing region 120. Using the sensor electrodes in the sensing region 120, the input device 300 measures capacitive sensing signals that indicate a location of the fingers or palm along the left and right sides 305 and 310 of the sensing region 120. While the input device 300 can include separate sensor electrodes disposed along the sides of input device 300 (e.g., electrodes in the side edges or under the edge bezel), in this embodiment, the location of the fingers or palm is detected using only the sensor electrodes in the sensing region 120—e.g., the sensor electrodes that are disposed in, or on, a display of the input device 300—which may reduce costs.

When performing capacitive sensing, the input device 300 measures capacitive sensing signals on the sensor electrodes which are affected by the capacitive coupling between the sensor electrodes in the sensing region 120 and the input objects disposed along the sides of the input device. After processing these signals, the input device 300 can identify the location of the fingers and the palm along the sides 305 and 310 of the sensing region 120. Stated differently, the input device 300 performs capacitive sensing region along a single axis (e.g., side 305 or 310) to determine a location of input objects along this axis. As described in more detail below, the location information can be processed to determine a change in position of the input object, velocity of the input object, acceleration of the object, and the like. Moreover, although FIGS. 3A and 3B illustrate fingers or a palm interacting with the sides 305 and 310, in other embodiments, the user may use a stylus to interact with the sides 305 and 310. In one embodiment, the input device 300 could include multiple electrodes (e.g., two columns of electrodes) extending along a side of the device 300 that enables the input device 300 to sense along different axes at the side.

In addition to detecting the location of input objects along the left and right sides 305 and 310, the input device 300 can also detect an input object along the top or bottom sides of the device 300. However, if the sensing region 120 is spaced too far from an external side of the device 300 (e.g., greater than 1 cm), the input device 300 may be unable to sense an input object. For example, if the sensing region 120 does not extend to the bottom of the input device 300—e.g., to leave space for physical buttons—the input device 300 may identify input objects proximate to only the top side, left side 305 and the right side 310 of the sensing region 120 where the region 120 does extend to the sides of the input device 300. In other embodiments, additional sensor electrodes specifically for sensing along a side may be disposed at or near the sides of the input device 300. In other embodiments, additional sensor electrodes specifically for sensing along a side may be disposed at or near that side.

As shown in FIG. 3A, a thumb 315 of the user holding the input device 300 is currently contacting a side of the input device 300 near the left side 305 of the sensing region 120. While at this location, the capacitive coupling between the thumb 315 and the sensor electrodes in the region 120 permit the input device 300 to identify the location of the thumb 315 along the axis defined by the left side 305. However, as the arrow in FIG. 3A indicates, the user moves the thumb 315 in a direction towards the side 305 so that the capacitive coupling between the thumb 315 and the sensor electrodes in the sensing region 120 increases.

FIG. 3B illustrates a time period when the thumb 315 has extended away from the left side 305 such that the capacitive coupling between the thumb 315 and the sensor electrodes does not have a substantial effect on the capacitive sensing signals measured by the input device 300. Stated differently, the input device 300 can no longer identify a location of the thumb 315 along the left side 305. As indicated by the arrow in FIG. 3B, the user has moved the thumb 315 away from the left side 305 so that the capacitive coupling between the thumb 315 and the sensor electrodes in the sensing region 120 is reduced. As will be described in detail below, the input device 300 can evaluate capacitive sensing signals measured during multiple capacitive frames to identify a tapping gesture where the user lifts an input object away from a side and then places the object back at approximately the same location. Once identified, this gesture can trigger a corresponding action such as navigating to a home screen, opening an application, closing an application, etc.

Figures 4A, 4B:
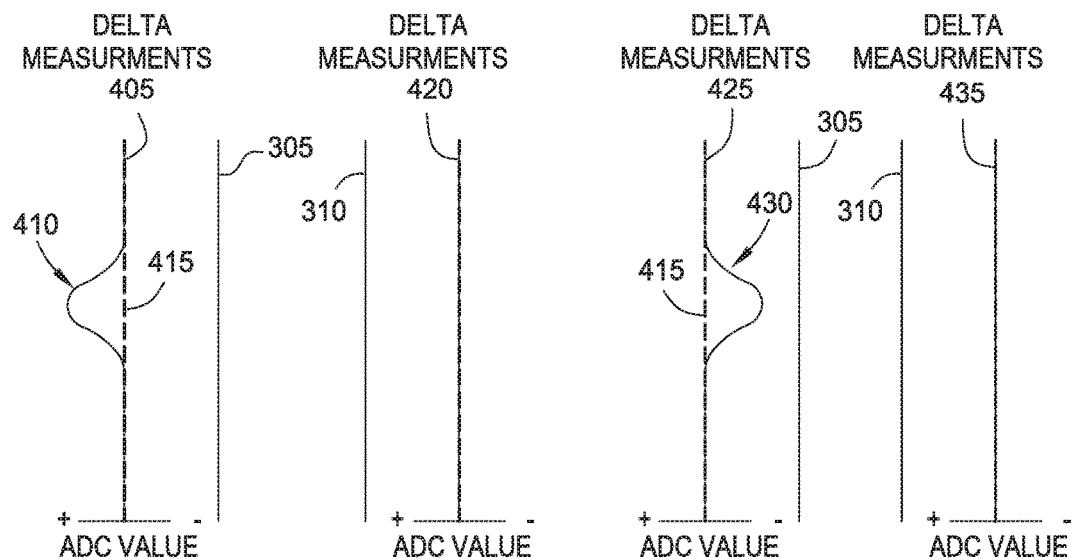
FIGS. 4A and 4B illustrate delta measurements corresponding to the tapping gesture in FIGS. 3A and 3B, according to one embodiment described herein.

FIGS. 4A and 4B illustrate delta measurements corresponding to the tapping gesture in FIGS. 3A and 3B. The delta measurements represent the difference between capacitive sensing measurements (or more generally, capacitive sensing signals) and baseline measurements. In one embodiment, the capacitive sensing measurements are digital values that represent the capacitive coupling between the sensor electrodes and an input object. For example, the input device may include one or more analog front ends and analog to digital converters (ADCs) for processing capacitive sensing signals using, for example, transcapacitive or absolute sensing techniques to output the capacitive sensing measurements. To identify a change in the capacitive coupling between the input object and the senor electrodes over time, the capacitive sensing measurements are compared to baseline measurements thereby resulting in delta measurements.

In FIGS. 4A and 4B, the delta measurements are derived using a differential baseline where the values used as the baseline measurements are selected from capacitive sensing measurements generated during a previous capacitive frame. As described in more detail below, in this embodiment, the input device always selects the Nth previous capacitive frame as the baseline and uses the capacitive sensing measurements for that frame as the baseline measurements. Thus, by subtracting the baseline measurements from the capacitive sensing measurement of the current frame, the input device can identify changes in the capacitive coupling occurring between the current frame and the previous frame that is used as the baseline.

Specifically, FIG. 4A illustrates delta measurements 405 that correspond to the left side 305 of the sensing region 120 when the hand of the user is positioned as shown in FIG. 3A. Here, it is assumed that the thumb 315 has recently touched down on the side of the input device 300 (i.e., a touch-down-event) that is proximate to side 305 of the sensing region 120. For example, if the input device uses the fifth previous capacitive frame as the differential frame, assume the user brought her thumb 315 proximate to side 305 sometime after the fifth previous frame occurred. Thus, when the capacitive sensing measurements of the fifth previous capacitive frame (i.e., the baseline measurements) are subtracted from the current capacitive sensing measurements, the result is the delta measurements 405 shown in FIG. 4A.

The delta measurements 405 include a positive peak 410 that corresponds to the location of the thumb 315 along the axis defined by the side 305 of the sensing region. Although the peaks are described as being "positive" or "negative," these signals can be flipped or captured in the opposite polarity depending on system design. The peak 410 illustrates where the capacitive sensing measurements for the current frame differ from those in the previous (baseline) frame. Because the thumb 315 was not proximate to the side 305 when the capacitive sensing measurements for the baseline frame were captured, subtracting the current capacitive sensing measurements results in the peak 410. As described below, the input device can use the location of the peak 410 to identify a location of the thumb 315 and perform gesture detection. In this case, the appearance of the positive peak 410 indicates a touch-down event.

Moreover, FIG. 3A illustrates that a portion of the palm of the hand is proximate to the lower portion of side 305, and as such, affects the capacitive sensing signals. However, because the palm did not move between the time when the capacitive sensing measurements for the baseline frame were measured and the time when the current capacitive sensing measurements were measured, subtracting these measurements results in substantially zero ADC values at the location of the side 305 near the palm. Thus, the zero-axis 415 represents where the baseline measurements and the current capacitive sensing measurements are substantially the same.

FIG. 4A also illustrates delta measurements 420 that correspond to side 310. Although three of the user's four fingers contact the side of the input device 300 proximate to side 310 of the sensing region 120, it is assumed that the fingers did not move between the time when the capacitive sensing measurements for the baseline frame were measured and the time when the current capacitive sensing measurements were measured. Thus, as explained above, when the baseline measurements are subtracted from the current capacitive sensing measurements, the resulting delta measurements are zero. However, if the user had moved the three fingers from a position where the fingers did not affect the capacitive sensing measurements to the locations shown in FIG. 3A sometime after the baseline frame, then the delta measurements 420 would include three positive peaks that each correspond to a location of the three fingers on side 310.

FIG. 4B illustrates delta measurements 425 that correspond to the left side 305 when the hand of the user is positioned as shown in FIG. 3B. That is, the delta measurements 425 represent the location of an input object relative to the side 305 when the thumb 315 is extended away from the input device 300. Because the thumb 315 no longer has a substantial effect on the capacitive sensing measurements captured by the sensor electrodes in the sensing region 120, the capacitive sensing measurements for the current frame are unaffected by the thumb 315. However, it is assumed here that the baseline measurements where captured when the thumb 315 was contacting the side of the input device 300 as shown in FIG. 3A. Thus, the baseline measurements were affected by the capacitive coupling between the thumb 315 and the sensor electrodes in the sensing region. When the baseline measurements from the previous frame is subtracted from the current capacitive sensing measurements, the resulting delta measurements 425 include a negative peak 430 corresponding to the location where the thumb 315 previously contacted the input device as shown in FIG. 3A. Thus, the input device can use negative peaks in the delta measurements 425 to identify lift-off events where input objects previously proximate to a side of the sensing region 120 have moved away from the region 120.

FIG. 4B also illustrates delta measurements 435 corresponding to the right side 310 of the sensing region 120 shown in FIG. 3B. Because the fingers have not moved relative to their position in FIG. 3A, the delta measurements 435 are the same as the delta measurements 420 in FIG. 4A—i.e., the measurements 435 have substantially zero ADC values.

Figure 5A:
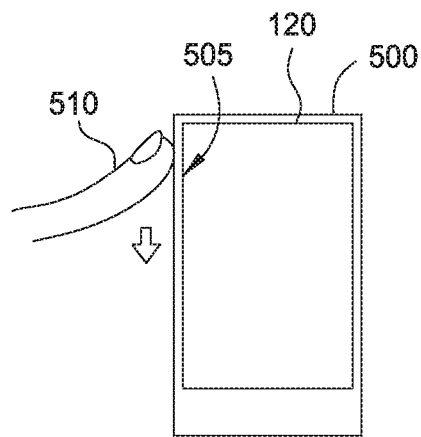
FIGS. 5A and 5B illustrate a swiping gesture along the side of an input device, according to one embodiment described herein.
Figure 5B:
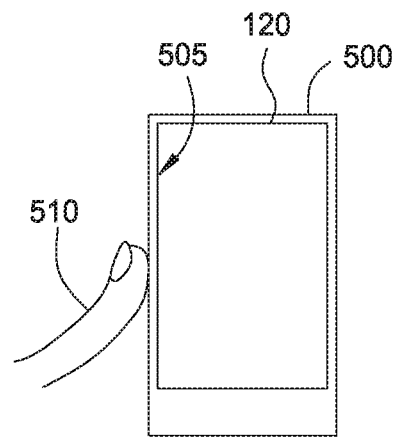

FIGS. 5A and 5B illustrate a swiping gesture along the side of an input device 500. In FIG. 5A, the user moves a finger 510 along the side of the input device 500 which is proximate to a left side 505 of the sensing region 120. As shown by the arrow, the user moves the finger 510 towards the bottom of the input device 500. FIG. 5B illustrates the result of the sliding gesture where the finger 510 has now moved to a different location along the left side 505 of the sensing region 120.

Figure 6A:
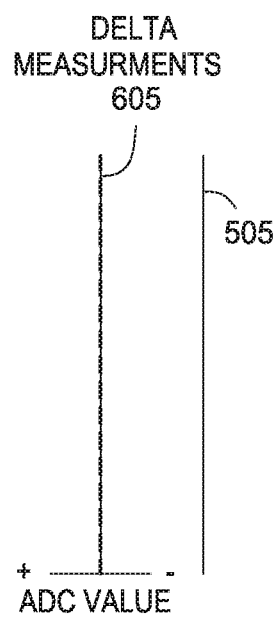
FIGS. 6A and 6B illustrate delta measurements corresponding to the swiping gesture in FIGS. 5A and 5B, according to one embodiment described herein.
Figure 6B:
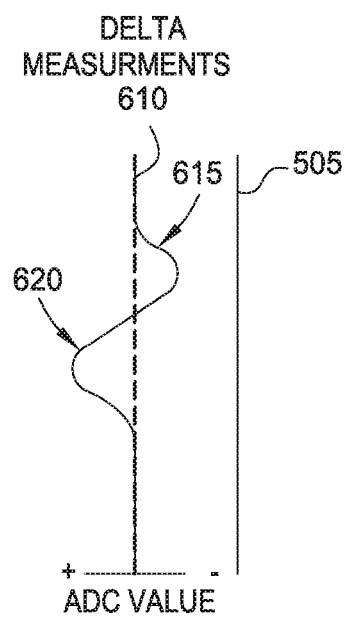

FIGS. 6A and 6B illustrate delta measurements corresponding to the swiping gesture in FIGS. 5A and 5B. Specifically, FIG. 6A illustrates delta measurements 605 that correspond to the location of the finger 510 shown at FIG. 5A before the finger 510 is moved in the swiping gesture. Here it is assumed that the finger 510 has been stationary at the location shown in FIG. 5A since at least when the capacitive sensing measurements used as the baseline measurements were captured. For example, if the baseline measurements are the measurements captured in the fifth previous frame, than the finger 510 has not moved for at least five frames. Thus, when the baseline measurements are subtracted from the current capacitive sensing measurements, the resulting delta measurements 605 are substantially zero since the finger 510 has not changed its position since the baseline frame.

FIG. 6B illustrates delta measurements 610 which correspond to the location of the finger 510 as shown in FIG. 5B. As shown, the delta measurements 610 include a negative peak 615 and a positive peak 620. The negative peak 615 corresponds to the previous location of the finger 510 in FIG. 5A before the swiping gesture. Because the capacitive sensing measurements for the baseline were captured when the finger was stationary at the location shown in FIG. 5A, subtracting the measurements results in the negative peak 615 at the previous location of the finger 510 and a positive peak at the new location of the finger 510 as shown in FIG. 5B. Generally, moving the finger away from a location causes the capacitive sensing measurements to decrease which results in negative ADC delta measurements, while moving the finger towards a new location causes the capacitive sensing measurements to increase which results in positive ADC delta measurements. By identifying a negative peak neighboring a positive peak, the input device can characterize the motion of the input object as a swiping gesture. However, in one embodiment, other criteria may also need to be satisfied before a negative peak neighboring a positive peak is characterized as a swiping gesture such as distance between the peaks, timing, and the like.

Figure 7:
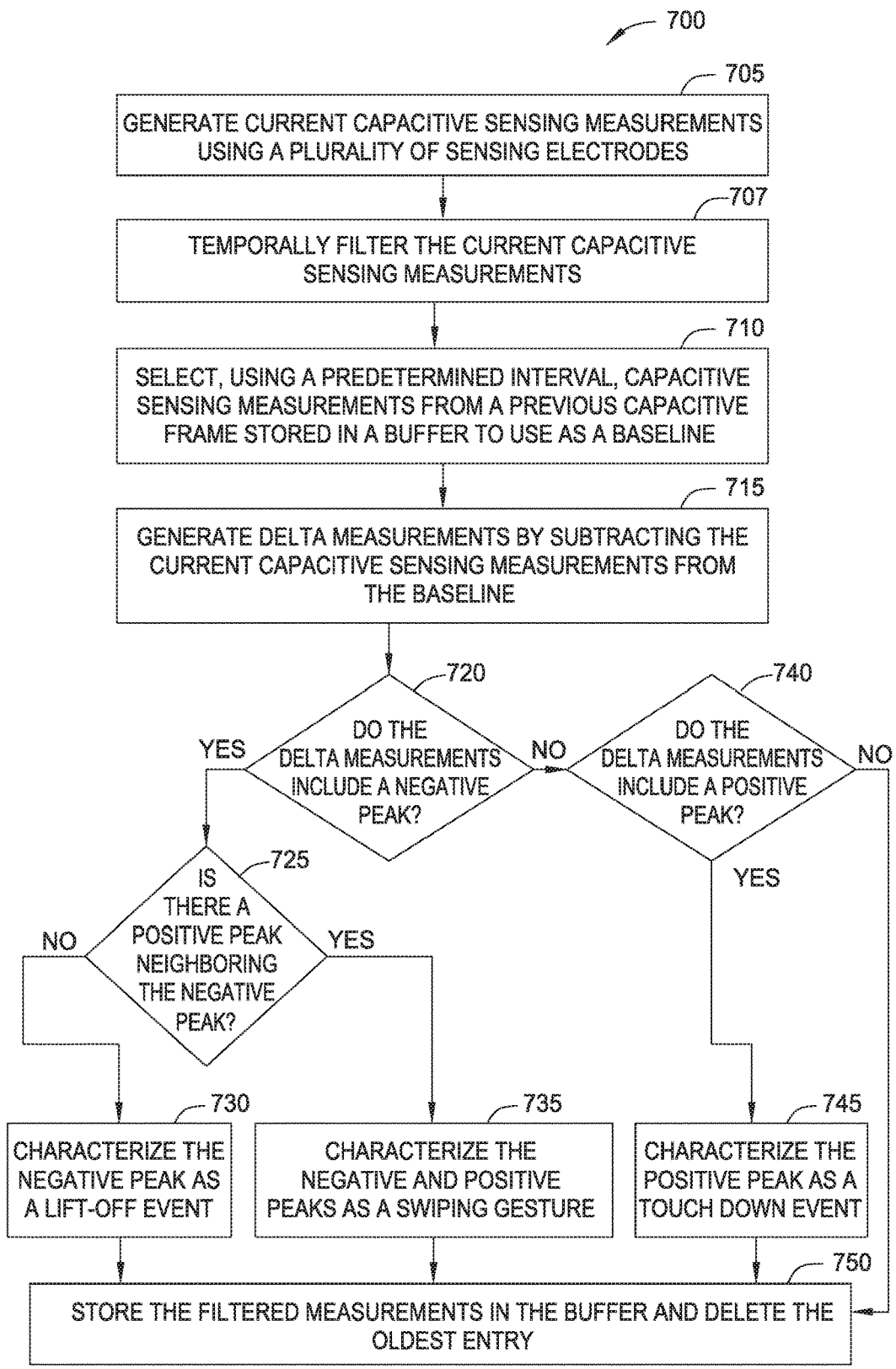
FIG. 7 is a flowchart for selecting a differential baseline when generating delta measurements, according to one embodiment described herein.

FIG. 7 is a flowchart of a method 700 for selecting a differential baseline when generating delta measurements. For ease of explanation, the different blocks in method 700 are discussed in tandem with FIG. 8 which illustrates a processing system 110 for performing gesture recognition along a single axis.

Method 700 begins at block 705 where the processing system 110 generates current capacitive sensing measurements 805 using a plurality of sensing electrodes. Although not shown, the processing system 110 may include a plurality of receivers and/or AFEs for converting received capacitive signals into digital capacitive sensing measurements 805. In one embodiment, the processing system 110 outputs updated capacitive sensing measurements for the sensing region each capacitive frame.

Figure 8:
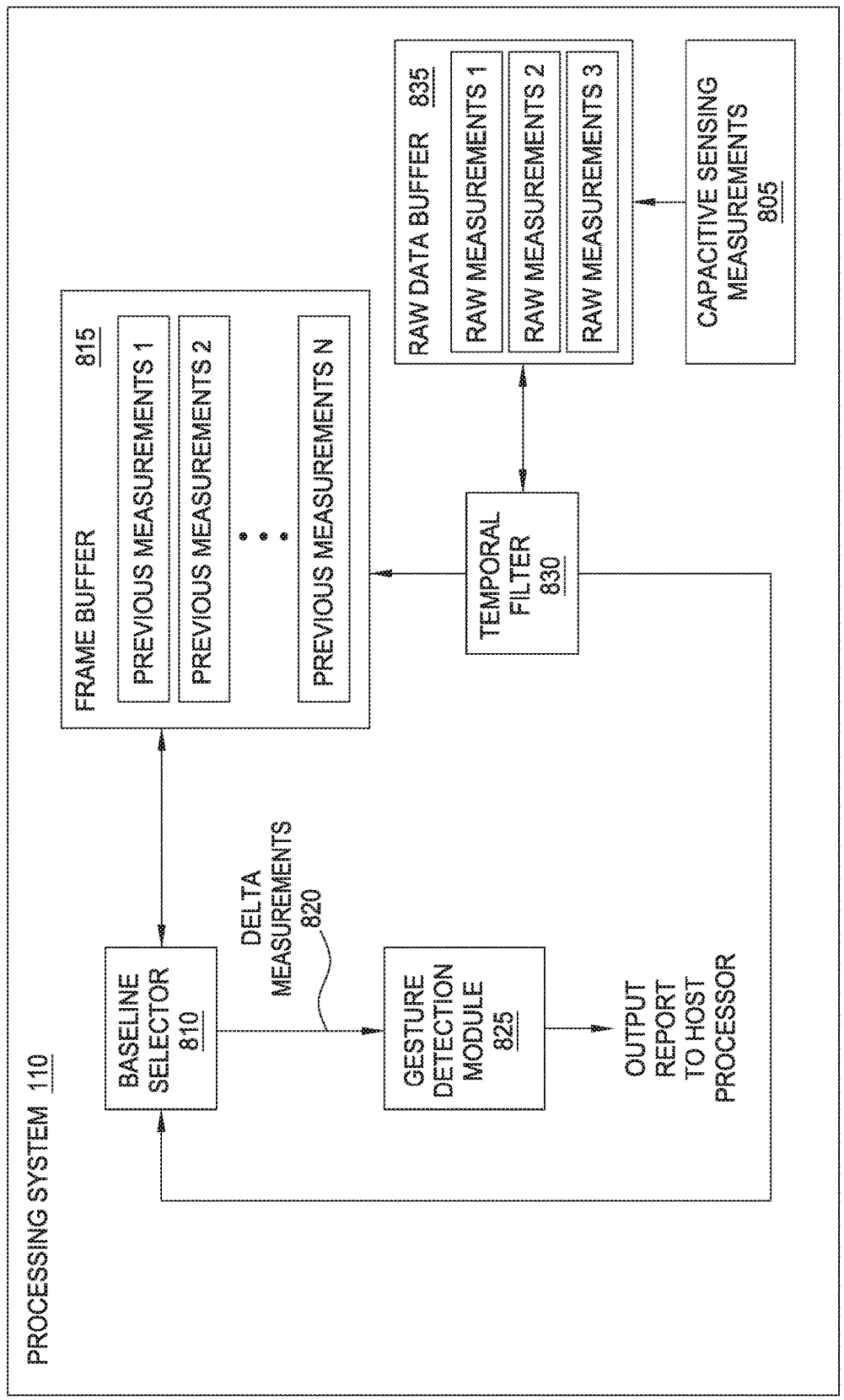
FIG. 8 illustrates a processing system for performing gesture recognition along a single axis, according to one embodiment described herein.

At block 707, the processing system 110 uses a temporal filter 830 to filter the current capacitive sensing measurements. As shown in FIG. 8, the current capacitive sensing measurements 805 are forwarded to a raw data buffer 835 which stores capacitive sensing measurement 805 (e.g., raw measurements 1-3) from the current and previous frames. To filter the measurements 805, the temporal filter 830 is coupled to a raw data buffer 835 which stores the raw (i.e., unfiltered) capacitive sensing measurements from previous capacitive frames. In this example, the raw data buffer 835 stores the raw sensing measurements for the three frames previous to the current capacitive frame, but the buffer 835 may store the raw measurements for any number of the previous capacitive frames.

To filter the current capacitive sensing measurements 805, the temporal filter 830 retrieves the raw measurements for the previous frames stored in buffer 835 and averages these measurements with the current capacitive sensing measurements 805. Also, the raw data buffer 835 may replace the oldest raw measurements with the current capacitive sensing measurements 805. As such, the capacitive sensing measurements for the subsequent capacitive frame can be filtered using the raw measurements captured in the previous three capacitive frames.

At block 710, a baseline selector 810 selects, using a predetermined interval, capacitive sensing measurements from a previous capacitive frame stored in a frame buffer 815 to use as a baseline. In FIG. 8, the frame buffer 815 includes a plurality of entries—i.e., previous measurements 1-N—that each store capacitive sensing measurements (which were temporally filtered previously) captured during previous capacitive frames. For example, the frame buffer 815 may store the capacitive sensing measurements generated from the previous five capacitive frames. The baseline selector 810 selects the previous measurements corresponding to the frame that is the predetermined interval away from the current frame. For example, if the predetermined interval is five, then the baseline selector 810 selects the previous capacitive sensing measurements for the fifth previous capacitive frame to use as the baseline measurements. In this manner, each time the processing system 110 generates new capacitive sensing measurements, the baseline selector 810 uses the predetermined interval (or fixed interval) to select previous capacitive sensing measurements stored in the buffer 815 to use as the baseline measurements.

Generally, there is a tradeoff when increasing or decreasing the predetermined interval. For example, as the predetermined interval decreases—i.e., previous capacitive sensing measurements from more recent capacitive frames are used as the baseline measurements—the differences between measurements of the current frame and the baseline measurements become smaller or more subtle which makes detecting gestures more difficult. However, as the predetermined interval increases—i.e., previous capacitive sensing measurements from less recent capacitive frames are used as the baseline measurements—the differences between the current frame and the baseline frame increase but the likelihood that processing system 110 may miss an event or gesture. For example, as the time period between the current frame and the frame used for the baseline increases, a user may perform a tapping gesture in the time between the baseline and current frames. The processing system 110 may miss the lift-off event (i.e., the negative peak as shown in FIG. 4B) since the current capacitive sensing measurements may be compared to a baseline frame when the finger was not near the side of the sensing region, and thus, the processing system 110 fails to recognize the tapping gesture. As such, the predetermined interval may be selected with these factors in mind.

At block 715, the baseline detector 810 generates delta measurements 820 by subtracting the current capacitive sensing measurements 805 (which were temporally filtered by the filter 830) from the baseline measurements. In one embodiment, the baseline detector 810 subtracts each of the current capacitive sensing measurements from a corresponding one of the previous measurements for the selected baseline frame stored in the frame buffer 815. Examples of delta measurements 820 are shown in FIGS. 4A, 4B, 6A, and 6B which correspond to different input object movements. As explained above, the delta measurements 820 illustrate the change in capacitance between the baseline measurements and the current capacitive sensing measurements.

The baseline selector 810 transmits the delta measurements 820 to a gesture detection module 825. Generally, the gesture detection module 825 evaluates the delta measurements 820 to determine whether an input object has performed a predefined gesture (e.g., a tap or swipe) at the side of the sensing region. Specifically, at block 720, the gesture detection module 825 determines if the delta measurements 820 for the capacitive frame include a negative peak. For example, the gesture detection module 825 may search the delta measurements 820 for a local minimum such as the negative peak 430 shown in FIG. 4B. The gesture detection module 825 may also perform finger reporting and tracking to a host.

If a negative peak is found, method 700 proceeds to block 725 where the gesture detection module 825 determines if there is a positive peak neighboring the negative peak. Although FIG. 7 illustrates detecting negative and positive peaks at two different blocks (e.g., block 720 and 725), these blocks may performed in parallel (i.e., at the same time). At block 725, the detection module 825 determines whether the negative peak was caused by a lift-off event where the user has removed a finger from the side of the device, or from a swipe gesture where the user has slid the input object to a different location along the side of the device. For example, the delta measurements 435 of FIG. 4B and the delta measurements 610 in FIG. 6B both have negative peaks that are caused by a lift-off event and a swiping gesture, respectively. However, a swiping gesture results in a neighboring positive peak (e.g., peak 625) that is adjacent to the negative peak. Moreover, positive peaks can be used to track finger motion. Thus, by evaluating the delta measurements 820 to identify whether a positive peak is neighboring the already identified negative peak, the gesture detection module 825 can determine if the input object performed a lift-off event or a swiping gesture.

If there is a neighboring positive peak, method 700 proceeds to block 735 where the gesture detection module characterizes the negative and positive peaks as a swiping gesture. Otherwise, method 700 proceeds to block 730 and characterizes the negative peak as a lift-off event.

Returning to block 720, if the gesture detection module 825 does not identify a negative peak, method 700 proceeds to block 740 where the module 825 determines whether the delta measurements include a positive peak. If so, at block 745, the gesture detection module 825 characterizes the positive peak as a touch-down event. That is, because the gesture detection module has previously determined there is no negative peaks thereby eliminating a lift-off event and swiping motion, the positive peak is caused by a touch-down event. The positive peaks can also be used to track the number of fingers and their location along the single axis.

Moreover, although not shown in method 700, the processing system 110 may store the touch-down events, lift-off events, and swiping gestures to determine if the combination of these actions indicate a predefined gesture. For example, if touch-down and lift-off events occur within the same general area and within a predefined time period (e.g., within five capacitive frames), the gesture detection module 825 may group these events into a tapping gesture. Similarly, if the user performs a swiping motion in a first direction along the axis up followed by a swiping motion in a second, opposite direction, the module 825 may characterize this as a combination gesture. Thus, after processing the delta measurements and identifying the actions at blocks 730, 735, and 745, the gesture detection module 825 may determine whether these actions should be combined with saved events or gestures from previous frames to indicate that the input object performed a predefined gesture which is a combination of actions over multiple frames. Various examples of recognizing gestures by storing previously identified gestures is provided in "SINGLE AXIS GESTURE RECOGNITION", application Ser. No. 15/080,135 which is herein incorporated by reference. Once a gesture is detected, the gesture detection module 825 can output a report to a host processor in the input device indicating that the input object has performed a predefined gesture along the side of the device. In response, the host processor can perform a corresponding action such as playing a sound, minimizing a window, scrolling a window, navigating to a home screen, and the like.

At block 707, the temporal filter 830 stores the filtered capacitive sensing measurements in the frame buffer 815 and deletes the oldest entry from the buffer 815. Stated differently, the temporally filtered capacitive sensing measurements replace the oldest entry in the frame buffer 815. Storing temporally filtered capacitive sensing measurements in the frame buffer 815 (rather than the raw, unfiltered measurements) may help to reduce noise that may appear in the current, raw capacitive sensing measurements 805. Thus, each of the entries in the frame buffer 815 may store temporally filtered capacitive sensing measurements rather than the raw capacitive sensing measurements 805 measured by the receivers in the processing system 110. For example, the Previous Measurements 1 may be a combination of the raw capacitive sensing measurements derived during the corresponding capacitive frame as well as the raw capacitive sensing measurements from the previous three frames.

In one embodiment, the number of entries in the frame buffer 815 corresponds to the predetermined interval. For example, if the baseline frame is always the fifth previous capacitive frame, then the frame buffer 815 may include only five entries. Thus, each time new capacitive sensing measurements are received, the oldest entry (which includes the measurements used as the baseline) is deleted to provide room for the filter measurements for the current capacitive frame generated by the temporal filter 830.

Figure 9:
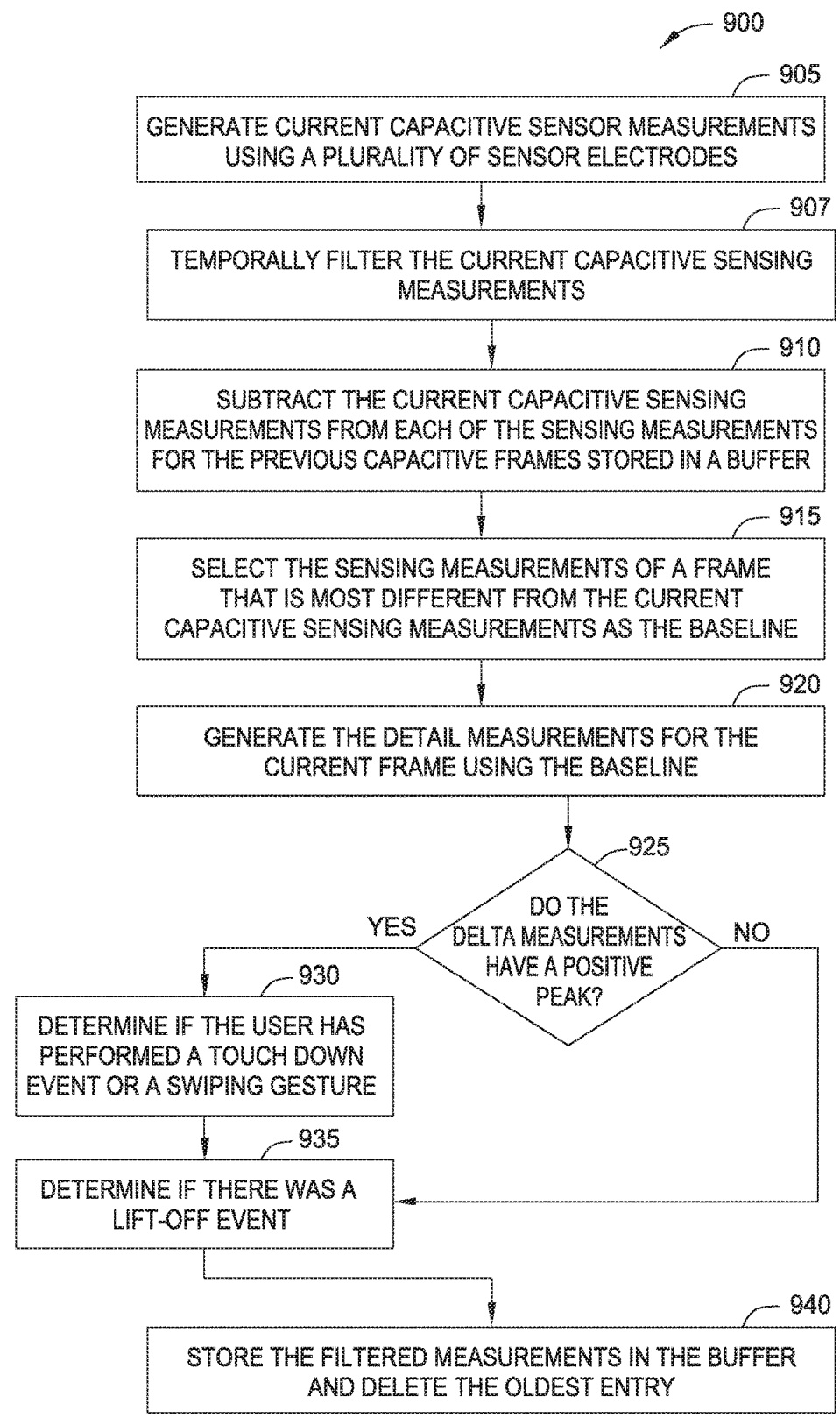
FIG. 9 is a flowchart for selecting a dynamic differential baseline when generating delta measurements, according to one embodiment described herein.

FIG. 9 is a flowchart of a method 900 for selecting a dynamic differential baseline when generating delta measurements. Unlike in method 700 that uses a predetermined interval to determine which previous frame to use as the differential baseline, here, the processing system 110 uses method 900 to dynamically select which of the previous capacitive sensing measurements to use for the baseline measurements. For ease of explanation, the different blocks in method 900 are discussed in tandem with the processing system 110 shown in FIG. 8.

At block 905, the processing system 110 generates current capacitive sensing measurements 805 using the plurality of sensor electrodes. In one embodiment, the processing system 110 includes a plurality of receivers and/or AFEs that convert received capacitive signals into digital capacitive sensing measurements 805 every capacitive frame.

At block 907, the temporal filter 830 filters the current capacitive sensing measurements 805 using previously saved raw measurements stored in the buffer 835. This process may be the same as block 750 in method 700.

At block 910, the baseline selector 810 subtracts the current capacitive sensing measurements 805 from each of the sensing measurements of the previous capacitive frames stored in the frame buffer 815. In one embodiment, the baseline selector 810 subtracts each one of the current capacitive sensing measurements to a corresponding one of the capacitive sensing measurements (which may have been temporally filtered) stored in an entry in the buffer 815. For example, the capacitive sensing measurements may include a digital value that corresponds to each electrode proximate to a side of the sensing region. When comparing the current capacitive frame to a previous capacitive frame, the baseline selector 810 subtracts the two measurements corresponding to the same electrode which indicates a change in the capacitance at that electrode.

In one embodiment, the baseline selector 810 chooses the subtraction that results in the greatest positive difference as the value to represent the particular capacitive frame (or entry). The baseline selector 810 then repeats the subtraction calculation with all the frames (i.e., entries) stored in the frame buffer 815. Unlike in method 700 where the frame buffer 815 may only store the same number of entries as the predetermined interval used to select the baseline, in method 900, the frame buffer 815 may include hundreds or thousands of entries for storing capacitive sensing measurements for previous capacitive frames. When subtracting the measurements 805 of the current frame with one of the previous frames, a resulting positive number indicates that an input object has moved to the location where the measurements were taken. Thus, a positive number indicates either a touch-down event at that location, or that the input object was slid to the location. In contrast, a resulting negative number indicates that the capacitive coupling has decreased as an input object has moved away from the location of the two capacitive sensing measurements.

In one embodiment, the baseline selector 810 identifies the greatest positive result of subtracting the current capacitive sensing measurements with the capacitive sensing measurements of a previous capacitive frame. For example, if the processing system 110 generates ten capacitive sensing measurements each frame, the baseline selector 810 determines which one of the ten values resulting from subtracting the measurements of a previous frame from the current measurements has the greatest positive value. This number is then used by the baseline selector 810 to compare the previous capacitive frames to determine which to use as the baseline. For example, if there are capacitive sensing measurements for one hundred previous capacitive frames stored in the frame buffer 815, the baseline selector 810 subtracts the measurements for each of these frames from the current capacitive sensing measurements 805 and identifies the greater positive value for each frame. That is, for each of the frames stored in the buffer 815, the baseline selector 810 identifies the greatest positive value for that frame. The baseline selector 810 uses these values to select which one of the previous frames in the buffer 815 to use as the baseline.

At block 915, the baseline selector 810 selects the capacitive sensing measurements of a previous frame stored in the frame buffer 815 that are most different from the current capacitive sensing measurements 805 as the baseline. In one embodiment, assuming the frame buffer 815 stores a hundred previous frames, the baseline selector 810 evaluates the hundred greatest positive values generated at block 910 and selects the frame that has the greatest positive value of all the frames stored in the buffer 815 as the baseline frame. In this manner, the baseline selector 810 determines which of the previously saved frames is the most suitable baseline for the current frame since the previously saved frame resulting in the greatest positive value has capacitive sensing measurements most different from the current capacitive sensing measurements 805.

One disadvantage of using previously saved capacitive sensing measurements as the baseline is that an input object can disappear. For example, if an input object remains stationary at the side of the sensing region for more than hundred capacitive frames (assuming the buffer 815 only holds a hundred frames), using any of these previous frames as the baseline means that there will be no positive peak in the delta measurements. Stated differently, the capacitive sensing measurements for the baseline frame and the current frame are the same. Thus, the locations of the input object are no longer represented in the delta measurements. However, for applications where the input device is concerned only with moving input objects (e.g., gesture detection), the location of a stationary finger may be unimportant.

At block 920, the baseline selector 810 generates the delta measurements for the current frame using the baseline frame selected at block 915. Although the examples above discuss finding the greatest difference between the corresponding measurements in the current frame and each of the previously stored frames and using that difference to select the baseline, other techniques may be used to dynamically select the baseline. For example, instead of selecting the greatest difference between the corresponding measurements, the baseline selector 810 may average the differences when subtracting the current and previous measurements. Furthermore, the baseline selector 810 may only average the resulting values that are above a threshold. In these examples, the baseline selector 810 evaluates the averages rather than an individual resulting value to determine which of the previous frames to use as the baseline.

Figures 10A, 10B:
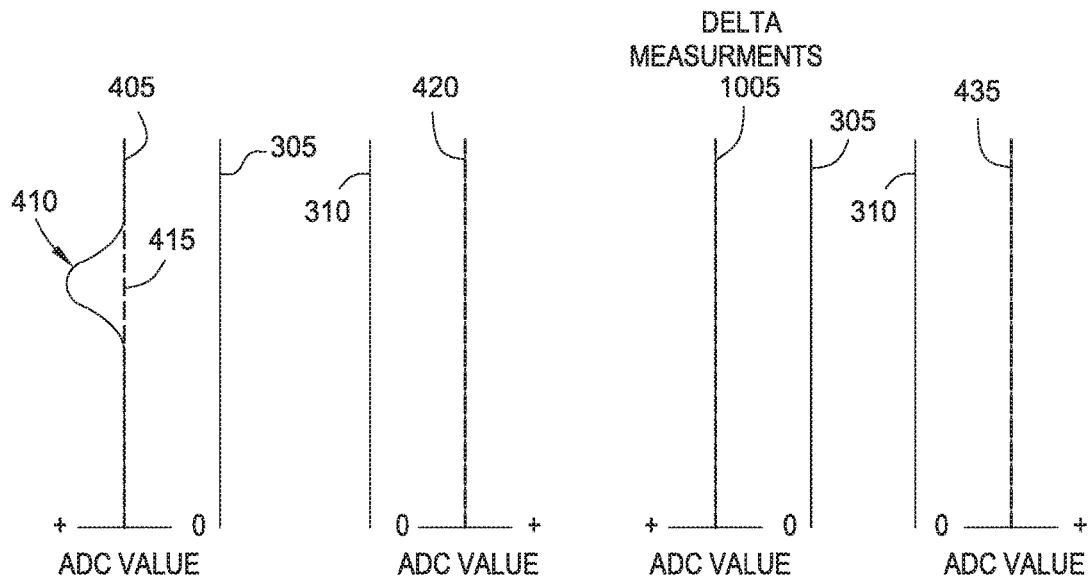
FIGS. 10A-10D illustrate delta measurements corresponding to the gestures in FIGS. 3A-3B and 5A-5B, according to one embodiment described herein.
Figures 10C, 10D:
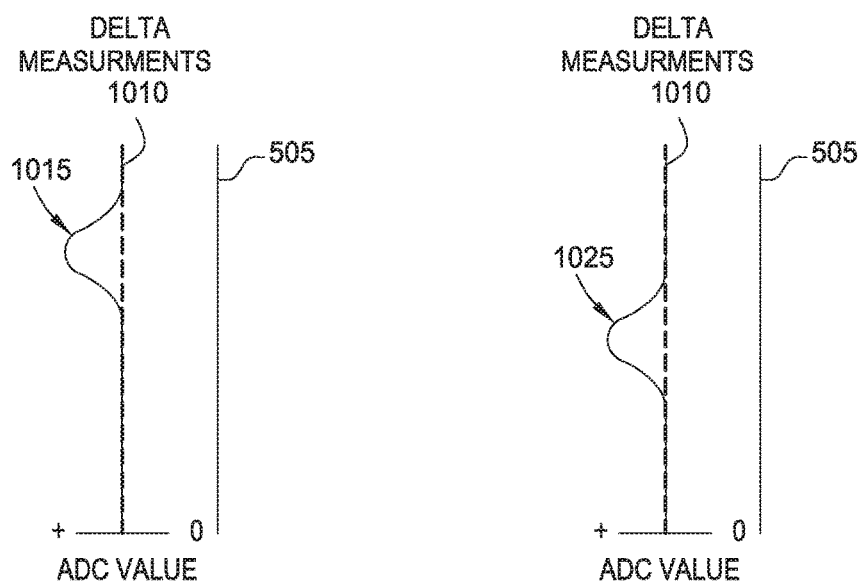

FIGS. 10A-10D illustrate delta measurements corresponding to the gestures in FIGS. 3A-3B and 5A-5B, according to one embodiment described herein. Specifically, FIG. 10A illustrates delta measurements 405 and 420 that correspond to the position of the hand shown in FIG. 3A. FIG. 10B illustrates delta measurements 1005 and 435 that correspond to the position of the hand shown in FIG. 3B. FIG. 10C illustrates delta measurements 1010 corresponding to the position of the finger shown in FIG. 5A. FIG. 10D illustrates delta measurements corresponding to the position of the finger shown in FIG. 5B. Moreover, unlike FIGS. 4A, 4B, 6A and 6B which illustrate delta measurements generated using method 700, the delta measurements shown in FIGS. 10A-10D are generated using blocks 905-920 of method 900.

In FIG. 10A, it is assumed that the user has recently moved her thumb 315 shown in FIG. 3A proximate to the side 305. Thus, using method 900 generates essentially the same delta measurements generated using method 700. That is, the baseline selector selects a previous capacitive frame where the thumb 315 was not proximate to the side 305 of the sensing region 120. As such, when the baseline capacitive sensing measurements are subtracted from the current capacitive sensing measurements, the result are delta measurements 405 that include a positive peak 410 that correspond to the location of the thumb 315 along the axis defined by the side 305 of region 120.

FIG. 10A also illustrates delta measurements 420 that correspond to side 310 of the sensing region 120 in FIG. 3A. Assuming the fingers have been stationary for more than the number of frames stored in the frame buffer, the delta measurements 420 do not represent the location of the fingers along the axis defined by side 310. Stated differently, the delta measurements no longer capture the location of the fingers on side 310.

Furthermore, if the fingers were not stationary for more than the number of frames stored in the frame buffer, the delta measurements 420 would include one or more peaks indicating a touch-down event, a lift-off event, or a swiping gesture. For example, if the fingers recently touched down at the side 310, the delta measurements 420 would include three positive peaks corresponding to the location of the fingers on the side 310. These three peaks would remain in the delta measurements until the frame buffer 815 no longer stores a previous frame where the fingers were not proximate to the side 310.

In FIG. 10B, it is assumed that the user has recently moved her thumb 315 away from side 105 as shown in FIG. 3B. That is, the thumb 315 is no longer capacitively coupled to the sensor electrodes disposed along the side 305 in the sensing region 120. As such, the capacitive sensing measurements for the previous frames are either generated when the thumb 315 is proximate to the side 305 or before the thumb 315 contacted the side 105 (e.g., before FIG. 3A). For the previous frames where the thumb 315 was proximate to side 315, these capacitive sensing measurements are greater at the location where the thumb was located than the current capacitive sensing measurements. Thus, when subtracting the measurements of the previous frames from the current measurements, the result is negative number. However, for the previous frames where the thumb 315 was not yet contacting the side of the input device 300, these measurements are substantially the same as the current sensing measurements. When subtracting the measurements of the previous frames from the current measurements, the result is substantially zero. Because the baseline selector chooses the baseline from the frames with the greatest positive result, the selector chooses a previous frame when the thumb 315 was not yet contact the side of the input device 300 as the baseline thereby yielding the delta measurements 1005.

Unlike in FIG. 4B, the delta measurements 1005 in FIG. 10B do not have a negative peak. In one example, the frame buffer may store only previous capacitive frames where the thumb was proximate to the side 305. Thus, subtracting capacitive sensing measurements from the previous frames from the current frames results in only negative values at the location of the thumb. Using one of the previous frames as the baseline would result in a negative peak in the delta measurements 1005. Instead, in one embodiment, the baseline selector may assign the delta measurements 405 as zero values wherever subtracting the current capacitive sensing measurements from the baseline measurements results in a negative value. Thus, in this embodiment, the input device may not recognize lift-off events where the input object was stationary for a long time previous. However, the input device may only be interested in identifying lift-off events that occur after a touch-down event (i.e., a tapping gesture). Thus, ignoring lift-off events that occur after the input object has been stationary for over a hundred capacitive frames may be preferred in order to simplify gesture detection as described below.

FIG. 10B also illustrates delta measurements 435 that correspond to the location of the fingers along the side 310 as shown in FIG. 3B. Because these fingers are assumed to be stationary during the previous frame stored in the frame buffer, the baseline selector can select any one of the previous frames to use as a baseline to result in the delta measurements 435.

FIG. 10C illustrates delta measurements 1010 corresponding to the location of the finger 510 along the side 505 in FIG. 5A. It is assumed that the finger 510 was recently moved to the location shown in FIG. 5A, and thus, the frame buffer includes a previously stored frame that includes capacitive sensing measurements generated when the finger 510 was not proximate to the side 505. Thus, when performing method 900, one of those capacitive frames is selected as the baseline. When the previous frame is subtracted from the current capacitive sensing measurements, the resulting delta measurements 1010 include a positive peak 1015 that indicates the location of the finger 510 on the axis defined by the side 505. However, if the finger 510 were stationary during the capacitive frames stored in the frame buffer, then the delta measurements 1010 would look the same as the delta measurements 605 in FIG. 6A (i.e., there would be no positive peak 1015).

FIG. 10D illustrates delta measurements 1020 corresponding to the location of the finger 510 along the side 505 in FIG. 5B. Here, the finger 510 has slide from the location shown in FIG. 5A to a new location further down the side 505. As a result, the delta measurements 1020 include a positive peak 1025 at the new location of the finger 510 along the axis defined by side 505. Unlike the delta measurements 610 in FIG. 6B where sliding the finger causes negative and positive peaks, here, the delta measurements 1020 only generate a positive peak 1025. This is because the baseline selector can dynamically select a previous capacitive frame as a baseline that includes capacitive sensing measurements generated when the finger 510 was not proximate to side 505 (i.e., before FIG. 5A when the finger 510 was not yet contacting the input device 500). During that frame, there was no finger at the previous location of the finger 510 as shown in FIG. 5A, and thus, when subtracting the baseline measurements from the current measurement, the delta measurements 1020 does not include a negative peak at the previous location of the finger 510 before it was swiped. Eliminating negative peaks from the delta measurements may simplify gesture detection as described below.

Returning to method 900, after block 920, the baseline selector 810 transmits the delta measurements 820 to the gesture detection module 825. At block 925, the gesture detection module 825 determines if the delta measurements 820 include a positive peak. If so, method 900 proceeds to block 930 to determine if the positive peak indicates that the user has performed a touch-down event or a swiping gesture.

To determine if the positive peak is a touch-down event, the gesture detection module 825 may first determine if the positive peak is new or has existed for more than predefined number of capacitive frames. In one embodiment, the gesture detection module 825 tracks when a positive peak first appears in the delta measurements 820. If the same positive peak is identified, the gesture detection module 825 may determine it is a result of the same input object, and thus, is not a touch-down event of a new input object.

To determine if the positive peak is part of a swiping gesture, the gesture detection module 825 determines if the positive peak corresponds to a peak in a previous delta measurement that has now moved. For example, using location information about previous positive peaks, the gesture detection module 825 may compare the current location of the peak to the locations of previous peaks stored in memory. If the current location is within a predefined distance away from a previous peak (that has now disappeared), the gesture detection module 825 represents a new location of the input object that cause the previous peak. In one embodiment, the gesture detection module 825 may track the location of the peak as it moves along the axis for several capacitive frames. The gesture detection module 825 may wait to indicate the input object has performed a sliding gesture until the input object has moved a minimum distance, or at a minimum rate, over a predefined number of capacitive frames.

At block 935, the gesture detection module 825 determines whether there was a lift-off event by determining if a peak has disappeared. That is, the gesture detection module 825 may compare the locations of the previously identified peaks to the same locations in the current delta measurements 820 determine if these peaks still exist. Furthermore, the gesture detection module 825 may ensure that the peak has disappeared rather than simply moved to a different location on the axis in response to a user moving the input object.

Upon determining a previously identified peak has disappeared from the current delta measurements 820, the gesture detection module 825 may determine if the lift-off event should be paired with a previous touch-down event to indicate a tapping gesture was performed. For example, if the lift-off event occurred within a predefined time period to a previously identified touch-down event that occurred at the same location, the gesture detection module 825 determines that the input object performed a tapping gesture. In another embodiment, the gesture detection module 825 may use the lift-off event as a trigger to evaluate previous delta measurements to determine if a swiping gesture occurred. Stated differently, the gesture detection module 825 may track the movement of a positive peak along the single axis and wait until a lift-off event occurs before evaluating the previous movement of the peak to determine if a swiping gesture occurred.

In addition to detecting tapping and swiping gestures, the gesture detection module 825 may detect combination gestures which are a combination of tapping and/or swiping gestures. After processing the current delta measurements to identify one or more gestures, the gesture detection module 825 outputs a gesture report to the host processor. Depending on what gestures are identified, the host processor can perform various tasks as described above.

At block 940, the temporal filter 830 stores the filtered measurements in the frame buffer 815 and deletes the oldest entry in the buffer 815. This process may be the same as block 750 in method 700. However, when the processing system 110 first begins generating the capacitive sensing measurements, the frame buffer 815 may be empty. As such, the temporal filter 830 may not delete the oldest entry in the buffer 815 until the buffer 815 has been filled to its maximum capacity.

Although the embodiments above describe detecting the location of an input object on a side (or sides) of a two or three dimensional sensing region, this disclosure is not limited to such. For example, the gesture detection techniques above may be used in a one dimensional sensor for identifying gestures. In one example, one or more sensor electrodes may be placed along a pen or other small cylindrical object for performing gesture recognition along a single axis defined by the sensor electrodes. Put differently, the sensor electrodes may be able to perform capacitive sensing only in one direction unlike sensing region 120 described above which can perform two or three dimensional sensing as well as one-dimensional sensing for input objects located on the sides of the input device.

The embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. An input device, comprising:
a plurality of sensor electrodes in a sensing region of the input device, wherein the sensing region is disposed on a first surface of the input device,
a processing system coupled to the plurality of sensor electrodes, the processing system configured to:
receive a plurality of capacitive sensing signals generated using the plurality of sensor electrodes, the plurality of capacitive sensing signals representing a location of an input object along a single axis, wherein a side of the sensing region defines the single axis, wherein the location of the input object corresponds to an estimated physical location of the input object on a second surface of the input device when the input object contacts the second surface, and wherein at least a portion of the second surface is perpendicular to the first surface;
comparing the plurality of capacitive sensing signals to capacitive sensing signals for each of a plurality of previous capacitive frames stored in a frame buffer to determine a respective difference value for each of the plurality of previous capacitive frames;
comparing the respective difference values for the plurality of previous capacitive frames in order to select one of the plurality of previous capacitive frames that has capacitive sensing signals most different from the plurality of capacitive sensing signals to use as a baseline;
generate delta measurements by calculating a difference between the plurality of capacitive sensing signals and the baseline;
identify the location of the input object along the single axis based on the delta measurements; and
identify a predefined gesture performed by the input object at the second surface by tracking a plurality of historical locations of the input object along the single axis during multiple capacitive frames.

2. The input device of claim 1, wherein the processing system is configured to:
remove capacitive sensing signals corresponding to one of the plurality of previous capacitive frames stored the longest in the frame buffer;
add a new entry to the frame buffer based on the plurality of capacitive sensing signals;
before adding the new entry to the frame buffer, temporally filter the plurality of capacitive sensing signals using raw capacitive sensing signals from at least one of the plurality of previous capacitive frames; and
store the temporally filtered capacitive sensing signals in the new entry.

3. The input device of claim 1, wherein identifying the location of the input object along the single axis based on the delta measurements comprises:
identifying a positive peak in the delta measurements; and
projecting the positive peak onto the single axis to determine the location of the input object on the single axis.

4. The input device of claim 1, wherein identifying the predefined gesture comprises:
compare the location of the input object to a saved location of a previously identified input object in the plurality of historical locations; and
upon determining that the location of the input object is within a predefined distance from the saved location, determining that the input object is the same as the previously identified input object.

5. The input device of claim 4, wherein the processing system is configured to, after determining that the input object is the same as the previously identified input object:
determine whether the location of the input object has moved relative to the saved location to indicate the input object is performing a swiping gesture along the second surface.

6. The input device of claim 4, wherein the processing system is configured to, after determining that the input object is the same as the previously identified input object:
receive new capacitive sensing signals for a subsequent capacitive frame;
evaluate new delta measurements derived from the new capacitive sensing signals to determine if the input object has performed a lift-off event; and
evaluate the lift-off event and a touch-down event to determine if the input object has performed a tapping gesture.

7. The input device of claim 1, wherein a distance from the side of the sensing region to the second surface is less than or equal to one centimeter, wherein the location of the input object corresponds to an estimated physical location of the input object along the side of the sensing region when the input object is not above the sensing region.

8. A processing system, comprising:
a baseline selector configured to:
receive a plurality of capacitive sensing signals generated using a plurality of sensor electrodes forming a sensing region on a first surface of an input device, the plurality of capacitive sensing signals representing a location of an input object along a single axis, wherein a side of the sensing region defines the single axis, wherein the location of the input object corresponds to an estimated physical location of the input object on a second surface of the input device when the input object contacts the second surface, and wherein at least a portion of the second surface is perpendicular to the first surface,
compare the plurality of capacitive sensing signals to capacitive sensing signals for each of a plurality of previous capacitive frames stored in a frame buffer to determine a respective difference value for each of the plurality of previous capacitive frames,
compare the respective difference values for the plurality of previous capacitive frames in order to select one of the plurality of previous capacitive frames that has capacitive sensing signals most different from the plurality of capacitive sensing signals to use as a baseline, and
generate delta measurements by calculating a difference between the plurality of capacitive sensing signals and the baseline; and
a detection module configured to identify the location of the input object along the single axis based on the delta measurements and identify a predefined gesture performed by the input object at the second surface by tracking a plurality of historical locations of the input object along the single axis during multiple capacitive frames.

9. The processing system of claim 8, further comprising a filter configured to:
remove capacitive sensing signals corresponding to one of the plurality of previous capacitive frames stored the longest in the frame buffer;
add a new entry to the frame buffer based on the plurality of capacitive sensing signals;
before adding the new entry to the frame buffer, temporally filter the plurality of capacitive sensing signals using raw capacitive sensing signals from at least one of the plurality of previous capacitive frames; and
store the temporally filtered capacitive sensing signals in the new entry.

10. The processing system of claim 8, wherein identifying the location of the input object along the single axis based on the delta measurements comprises:
identifying a positive peak in the delta measurements; and
projecting the positive peak onto the single axis to determine the location of the input object on the single axis.

11. The processing system of claim 8, wherein the detection module is configured to as part of identifying the predefined gesture:
compare the location of the input object to a saved location of a previously identified input object in the plurality of historical locations; and
upon determining that the location of the input object is within a predefined distance from the saved location, determining that the input object is the same as the previously identified input object.

12. The processing system of claim 11, wherein the detection module is configured to, after determining that the input object is the same as the previously identified input object:
determine whether the location of the input object has moved relative to the saved location to indicate the input object is performing a swiping gesture along the second surface.

13. The processing system of claim 11, wherein the detection module is configured to, after determining that the input object is the same as the previously identified input object:
receive new capacitive sensing signals for a subsequent capacitive frame;
evaluate new delta measurements derived from the new capacitive sensing signals to determine if the input object has performed a lift-off event; and
evaluate the lift-off event and a touch-down event to determine if the input object has performed a tapping gesture.

14. A method, comprising:
receiving a plurality of capacitive sensing signals generated using a plurality of sensor electrodes forming a sensing region on a first surface of an input device, the plurality of capacitive sensing signals representing a location of an input object along a single axis, wherein a side of the sensing region defines the single axis, wherein the location of the input object corresponds to an estimated physical location of the input object on a second surface of the input device when the input object contacts the second surface, and wherein at least a portion of the second surface is perpendicular to the first surface;
comparing the plurality of capacitive sensing signals to capacitive sensing signals for each of a plurality of previous capacitive frames stored in a frame buffer to determine a respective difference value for each of the plurality of previous capacitive frames;
comparing the respective difference values for the plurality of previous capacitive frames in order to select one of the plurality of previous capacitive frames that has capacitive sensing signals most different from the plurality of capacitive sensing signals to use as a baseline;
generating delta measurements by calculating a difference between the plurality of capacitive sensing signals and the baseline;
identifying the location of the input object along the single axis based on the delta measurements; and
identify a predefined gesture performed by the input object at the second surface by tracking a plurality of historical locations of the input object along the single axis during multiple capacitive frames.

15. The method of claim 14, further comprising:
adding a new entry to the frame buffer based on the plurality of capacitive sensing signals;
temporally filtering the plurality of capacitive sensing signals using raw capacitive sensing signals from at least one of the plurality of previous capacitive frames before adding the new entry to the frame buffer; and
storing the temporally filtered capacitive sensing signals in the new entry.

* * * * *